United States Patent [19]

Warren, Jr. et al.

[11] 4,213,102

[45] Jul. 15, 1980

[54] FLUORINE GENERATOR FOR CHEMICAL LASERS

[75] Inventors: Walter R. Warren, Jr., Rancho Palos Verdes; Donald A. Durran, Manhattan Beach; Donald J. Spencer, Torrance, all of Calif.

[73] Assignee: The United States of America as represented by the Secretary of the Air Force, Washington, D.C.

[21] Appl. No.: 888,813

[22] Filed: Mar. 21, 1978

[51] Int. Cl.$^2$ .............................................. H01S 3/22
[52] U.S. Cl. .............................................. 331/94.5 G
[58] Field of Search ...................... 331/94.5 G, 94.5 P; 423/500

[56] References Cited

U.S. PATENT DOCUMENTS

| | | | |
|---|---|---|---|
| 1,728,230 | 9/1929 | De Boer | 423/500 |
| 2,038,083 | 4/1936 | Lundstrom et al. | 423/401 |
| 2,138,017 | 11/1938 | Beekhuis, Jr. | 423/401 |
| 3,876,959 | 4/1975 | Biancardi et al. | 331/94.5 G |
| 4,102,988 | 7/1978 | Martignoni et al. | 423/500 X |
| 4,115,168 | 9/1978 | Buonadonna et al. | 331/94.5 G X |

Primary Examiner—James W. Davie
Attorney, Agent, or Firm—Joseph E. Rusz; William J. O'Brien

[57] ABSTRACT

A system for generating fluorine for use as a gaseous reactant in a chemical laser from a storable gas supply of $NF_3$.

3 Claims, 2 Drawing Figures

FLUORINE GENERATOR FOR CHEMICAL LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates to chemical lasers. More particularly, this invention concerns itself with continuous wave or repetitively pulsed chain chemical lasers and to a system for generating a fluorine reactant material for use therewith.

Laser systems that utilize a gaseous medium to generate a lasing action by means of a chemical reaction are well known. In general, the requisite population inversion of the gaseous medium is effected by the diffusion of a first gaseous reactant material, such as hydrogen or deuterium, into a second gaseous material such as fluorine. The two reactant gases react chemically to provide a flow of a vibrationally excited molecular gaseous product with the necessary population inversion and lifetime to create a lasing action. The vibrationally excited gas is then allowed to flow into a resonant cavity where lasing takes place. These lasers have proven highly successful for a number of applications and possess an exceedingly high military potential.

However, the use of molecular fluorine as a reactant material presents a serious problem because of the immense storage and handling hazards associated with its use. Its toxic nature also precludes its uses, especially for airborne military uses. On the other hand, there are very strong technical reasons, such as high specific efficiency, large power operation and excellent atmospheric transmission characteristics, which mandate the use of fluorine as a chemical laser reactant. As a result, a considerable research effort has been expended in an attempt to exploit the high military potential of the HF/DF chemical laser. The need for developing a fluorine generating system arose directly from the need to resolve the safety problems associated with fluorine handling which, in turn, lead to the development of the present invention.

SUMMARY OF THE INVENTION

In accordance with this invention, it has been found that the storage, handling and toxicity problems associated with the use of fluorine as a reactant for chemical lasers can be overcome through the use of a storable gas supply of $NF_3$ as a means for generating molecular and/or atomic fluorine for use with HF or DF, cw or respectively pulsed chain chemical lasers. The high efficiency of pulsed HF laser operation at one atmosphere pressure has been demonstrated in laboratory studies. A scaled up version of the laboratory system obviously has a direct application in military missions as an airborne laser. However, the problems attendant the use of fluorine precludes its utilization as a stored gas. The present invention solves this problem, however, by replacing $F_2$ with $NF_3$. The $NF_3$ is thermally dissociated, then cooled to the temperature required for use in the laser immediately prior to injection into the laser plenum.

Accordingly, the primary object of this invention is to provide a system for generating fluorine for use in chemical lasers that overcomes the safety problem associated with $F_2$ handling.

Another object of this invention is to provide a fluorine generating system for chemical lasers that is particularly adaptable for airborne laser applications.

Still another object of this invention is to provide a system that utilizes a storable gas supply of $NF_3$ as the basic medium for generating the fluorine reactant used in HF and DF chemical lasers.

The above and still other objects and advantages of the present invention will become more readily apparent upon consideration of the following detailed description thereof when taken in conjunction with the accompanying drawings.

DESCRIPTION OF THE PREFERRED EMBODIMENT

Figure 1:
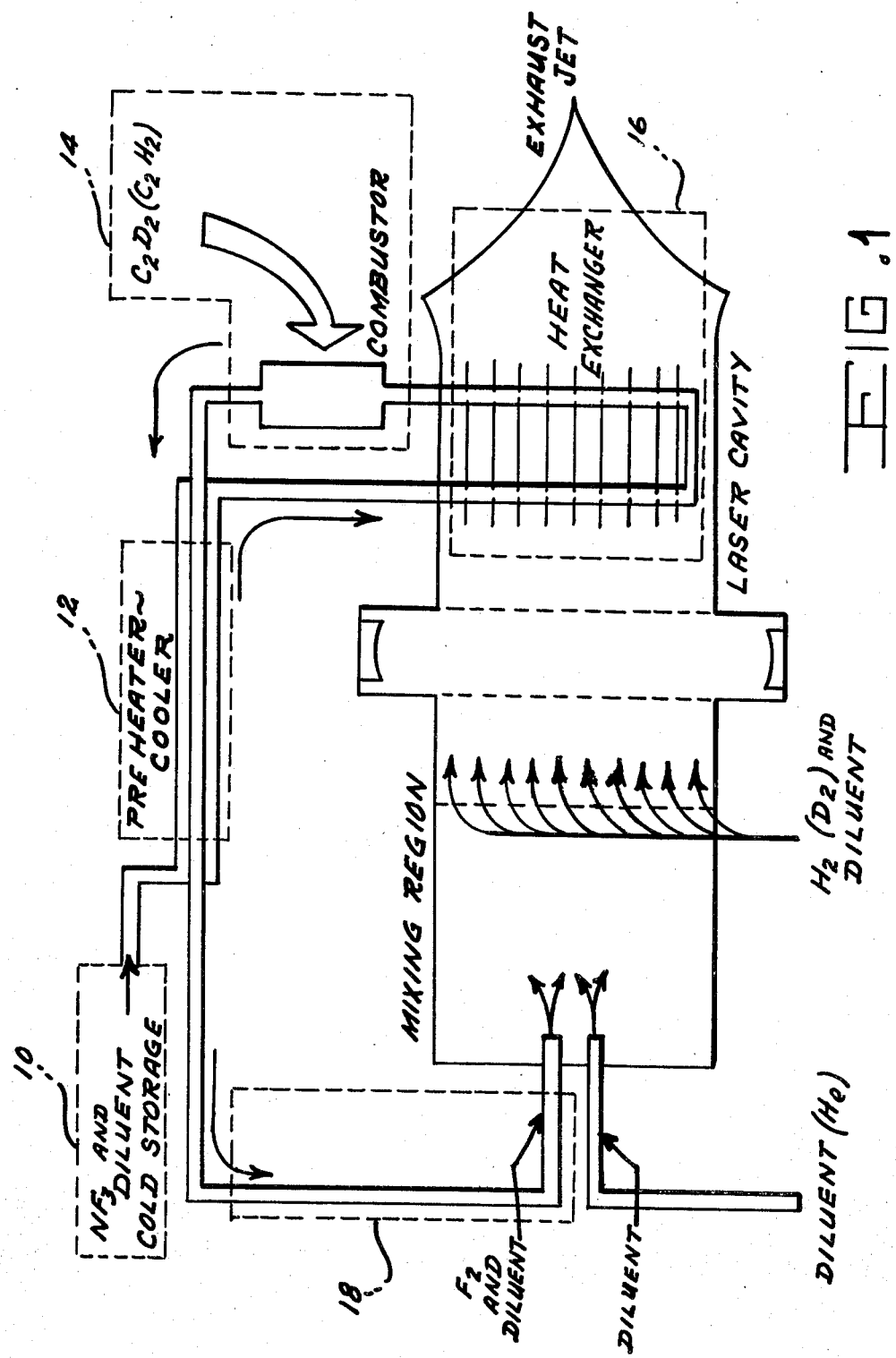
FIG. 1 represents a schematic flow diagram showing a repetitively pulsed HF/DF chain chemical laser with the fluorine generating system of this invention.

The present invention provides a system for generating fluorine for use as a gaseous reactant in a chemical laser. The system provides molecular and/or atomic fluorine for use with HF or DF cw or pulsed chemical lasers from a storable gas supply of $NF_3$. The need for such system arises directly from the need to resolve the large safety problem associated with $F_2$ handling. The immense storage hazard and toxicity associated with molecular fluorine essentially precludes usage of $F_2$ directly in high flow applications. On the other hand there are strong technical reasons (high specific efficiency, large power operation, excellent atmospheric transmission characteristics) for desiring to exploit the exceedingly high military potential of the HF/DF chemical lasers.

In particular, recent laboratory studies have demonstrated high efficiency pulsed HF laser operation at one atmosphere pressure. Scaled up versions of this laboratory device obviously would have direct application in military missions as airborne lasers. However, the lasing operation of these devices depends upon the usage of $F_2$ as a major constituent of the gas composition in the laser cavity region. Unfortunately, the extreme chemical reactivity of fluorine prevent its use as a stored gas.

The invention described herein, however, provides a solution to the gas storage problem by replacing $F_2$ with $NF_3$, a less toxic and much less chemically reactive gas than fluorine. The $NF_3$ is thermally dissociated then cooled to the temperature required for use in the laser immediately prior to injection into the laser plenum. The recombination products of this process are $N_2$ and $F_2$ at temperatures below $\sim 900°$ K. according to the dissociation recombination reaction.

$$2NF_3 \rightarrow N_2 + 3F_2 \tag{1}$$

The $N_2$ acts as an inert diluent gas except for some deactivation of excited DF molecules. Laser operation requires mixing the fluorine flow with $H_2$ or $D_2$ fuel in which excited HF or DF molecular species are generated through the chain chemical reaction which is described by the following equations:

| | |
|---|---|
| (II) $H_2 + F_2 \rightarrow 2 HF$ $\Delta H$ | $= -129.6$ K cal/mole of $H_2$ |
| | $= -6.15 \times 10^6$ J/lb |
| (III) (a) $F_2 + M \rightarrow 2F + M$ | |
| (III) (b) $F + H_2 \rightarrow HF(v) + H$ $\Delta H$ | $= -31.7$ K cal/mole |
| (III) (c) $H + F_2 \rightarrow HF(v) + F$ $\Delta H$ | $= -97.9$ K cal/mole |

Equation (II) indicates the large release of energy in the overall reaction while equations (III) define individual steps in the reaction. The reaction is initiated by the dissociation of $F_2$, as shown by equation [III(a)], and results in atomic F that reacts with $H_2$ according to equation [III(b)]. This reaction generates H that reacts with $F_2$, as shown by equation [III(c)], to generate further F atoms. Hence, equations [III(b)] and [III(c)] represent a chain reaction that creates vibrationally excited HF (v).

The heat required for dissociation of the $NF_3$ is obtained from a partial combustion in a combustor of $NF_3$ with $H_2/C_2H_2$ or other suitable reactant for a DF laser or $D_2/C_2D_2$ or other suitable reactant for an HF laser (the combustion process must not generate any ground state molecules of the lasing species). Thereafter, thermal quenching of the atomic fluorine to molecular fluorine takes place in a cooler. The combustor can be augmented with a regenerative thermal system such as a heat exchanger.

This system utilizes the heat exchanger/cooler/combustor under steady state operation for $NF_3$ dissociation/$F_2$ recombination, with the cold storage $NF_3$, hot laser combustion exhaust gases, and combustor serving as the energy sink and sources required to affect the $F_2$ generation process. A schematic representation of the proposed system is shown in FIG. 1. Cold storage $NF_3$ plus diluent shown at 10, is passed through the cold side of a pre-heater-cooler 12 where it rises in temperature as it extracts heat from the heated gas returning from the combustor 14 and heat exchanger 16. The pre-heated gas then flows through the heat exchanger and combustor. The former is located downstream of the laser exhaust where sufficient energy is extracted from the exhaust flow to partially dissociate the $NF_3$ under steady state operation; the combustor completes the dissociation process.

The gas is then passed through the hot side of the pre-heater-cooler 12 where a thermal quenching of the F atoms results in the generation of $F_2$ plus the $N_2$ and diluent carrier (generally helium). The $F_2$ flow is then immediately injected through inlet means 18 into the mixing plenum region of the laser device where it is further mixed with diluent for temperature and/or dilution level control. In practice, a minimum amount of diluent would be used in the $NF_3$ (initial) stream so that a minimum amount of thermal and chemical energy is required to fully dissociate the $NF_3$. At start-up, the combustor is the only energy source in operation; it will take several flow transit times (the order of 3) to bring the heat exchanger to operating temperatures, and thus the whole system to steady state operation.

Two principal applications for the system of this invention are currently known. First, it is useful for an HF/DF Pulsed Chain Chemical Laser and secondly, for an HF/DF CW Chemical Laser. The fundamental difference between these two laser systems insofar as this invention is concerned, lies in the required dissociation level of the molecular fluorine, i.e., the $F_2/F$ gas temperature necessary for optimum laser performance. The pulsed chemical laser operates by premixing the oxidizer and fuel, i.e., molecular fluorine and $H_2$ or $D_2$ with diluent as required, at temperatures below combustion temperature (nominally $T < 500°$ K). Complete absence of F atoms is essential in this application. This mixture then flows into a laser cavity where the chemical reaction which gives rise to laser action is initiated by means of an electrical discharge triggered by an e-beam discharge at a high repetition rate.

Figure 2:
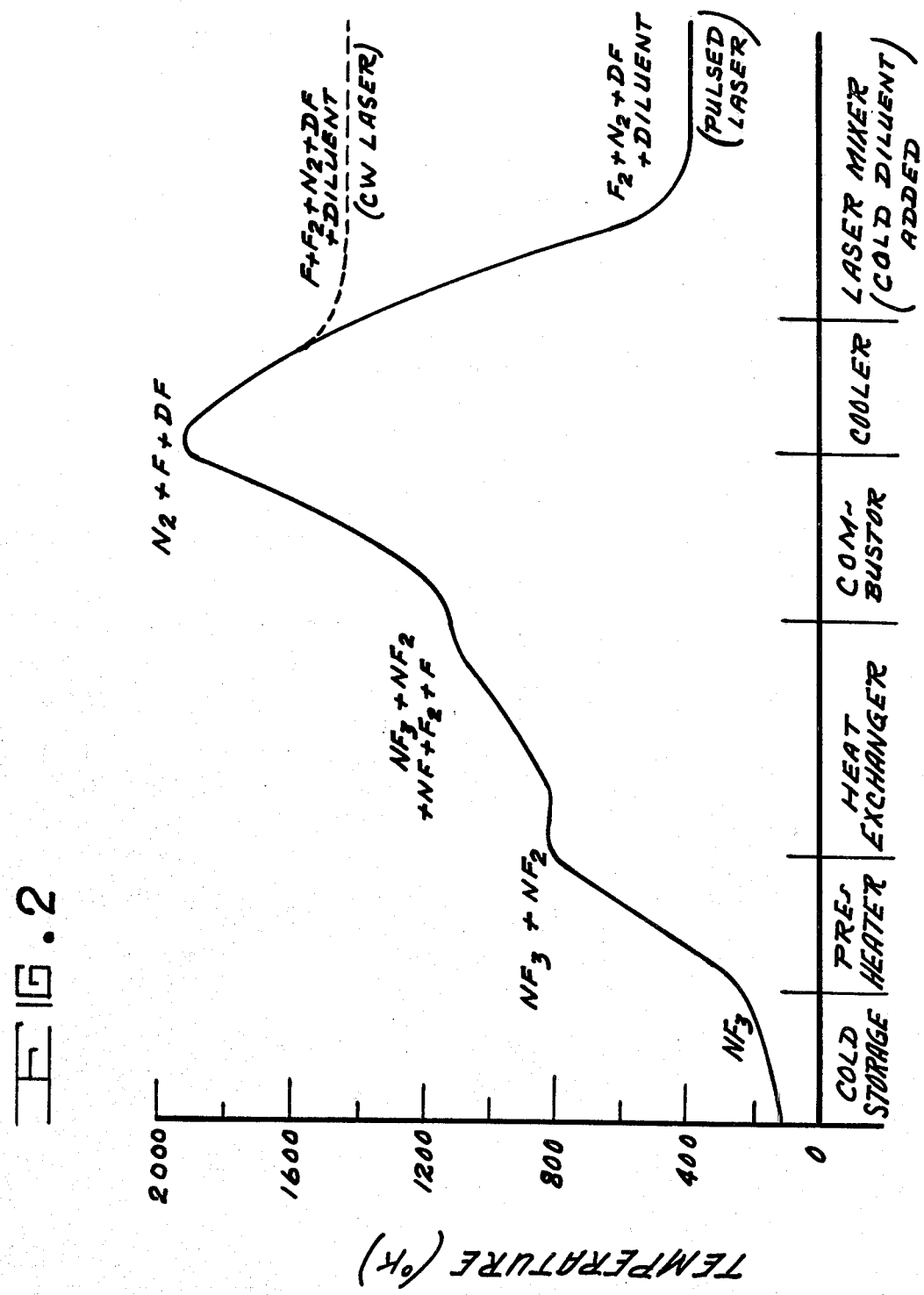
FIG. 2 represents a graphical illustration of the steady state temperature history which occurs with the fluorine producing system of this invention.

The cw chemical laser on the other hand requires a higher temperature fluorine flow to ensure the presence of F atoms to initiate the chemical reaction. These different applications translate simply into a need for output gas temperature thermal control. FIG. 2 illustrates a typical gas temperature history for the two applications indicating a range of output gas temperatures available through the use of this system. Gas temperature control is attained by means of diluent addition, pre-heater-cooler and heat exchanger design, and controlled partial combustor heating of the $NF_3$ bearing gas.

In order to demonstrate the present invention, a testing procedure was undertaken in which the above described technique for generating $F_2$ by means of thermal quenching of arc heated $NF_3$ was demonstrated. An in-line water-cooled heat exchanger was installed between the arc heater and nozzle of a chemical laser facility. $NF_3$ was injected in the hot helium flow emanating from the arc heater where it was dissociated. The gas temperature was reduced to $600°-800°$ K. in passage through the heat exchanger. An $F_2$ absorption diagnostic technique employing a HeCd325 nm laser beam was used to measure the $F_2$ concentration. The test results showed virtually 100% conversion efficiency. This successful demonstration of the thermal quench technique establishes the feasibility of Pulsed HF/DF and cw HF/DF laser operation without need for an $F_2$ storage capability.

While the invention has been described with particularity in reference to specific embodiments thereof it is to be understood that the disclosure of the present invention is for the purpose of illustration only and is not intended to limit the invention in any way, the scope of which is defined by the appended claims.

What is claimed is:

1. In a DF or HF chemical laser having a gas mixing region, a resonant cavity, a gas exhaust region, means for introducing a first fluorine gaseous reactant into said mxing region, and means for introducing a second gaseous reactant selected from the group consisting of HF and DF into said mixing region, the improvement which comprises means for the cold storage of an $NF_3$ gaseous component capable of generating said first fluorine gaseous reactant, means for preheating said stored gaseous component, means for effecting the dissociation of said preheated gaseous component to fluorine, means for cooling said dissociated gaseous fluorine, and means for presenting said cooled, dissociated, gaseous fluorine to said gas mixing region.

2. A chemical laser in accordance with claim 1 wherein said dissociation means includes a regenerative heat exchange means positioned downstream from said exhaust means.

3. A chemical laser in accordance with claim 2 further including a combustor means in association with said regenerative heat exchange means.

* * * * *